Figure 4:
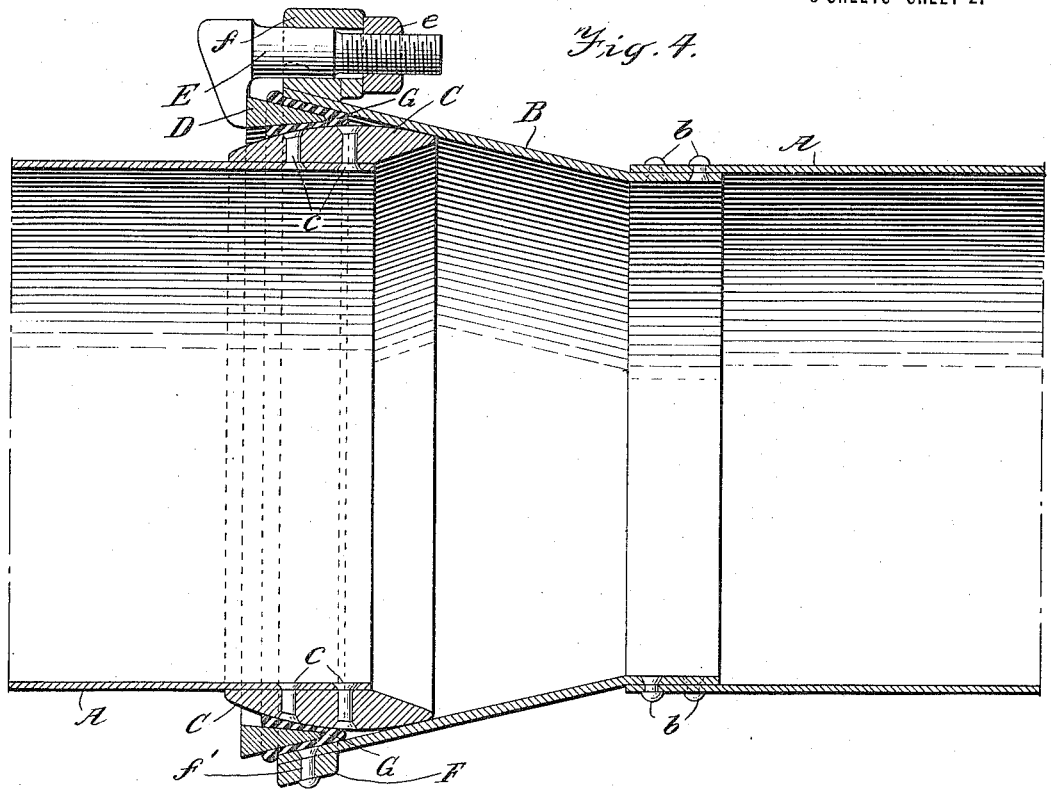

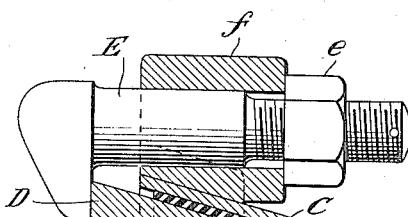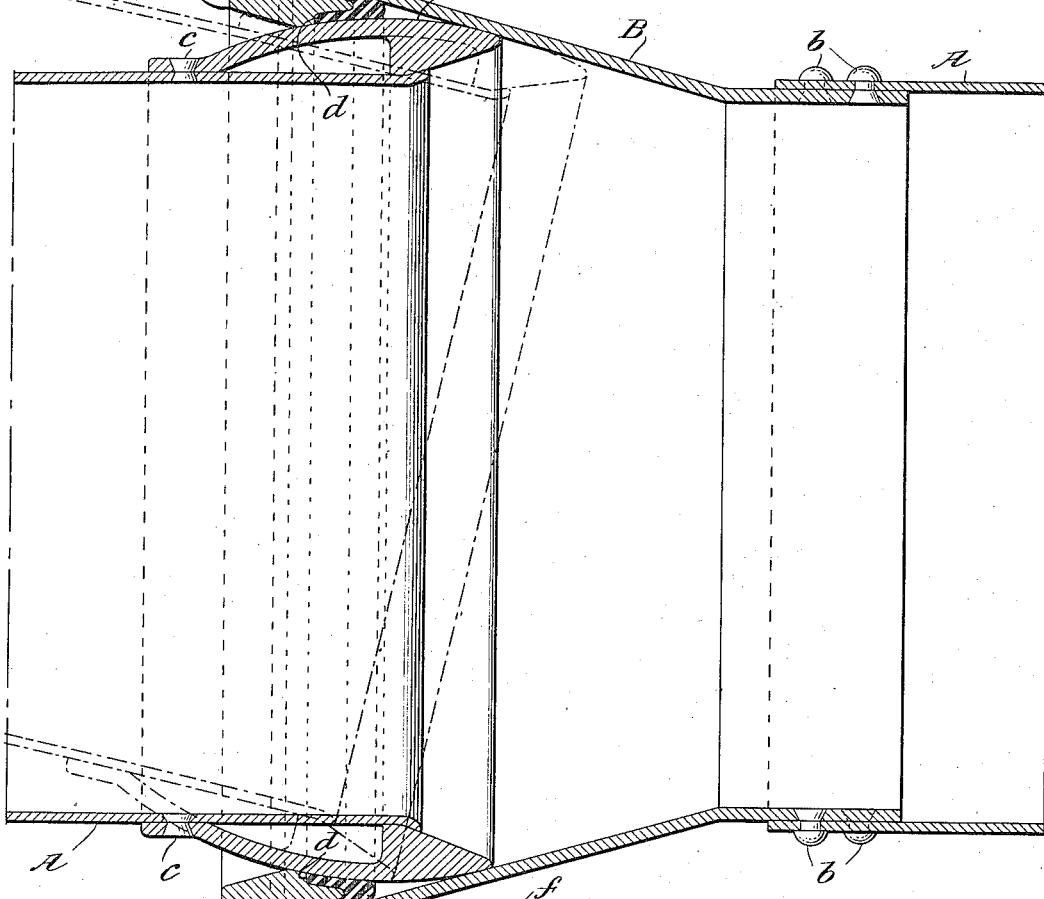

L. S. PARKER.
PIPE COUPLING.
APPLICATION FILED JAN. 22, 1913.

1,193,482.

Patented Aug. 1, 1916.
3 SHEETS—SHEET 2.

Witnesses:

Inventor
Levie S. Parker
By his Attorneys
Gifford Bull

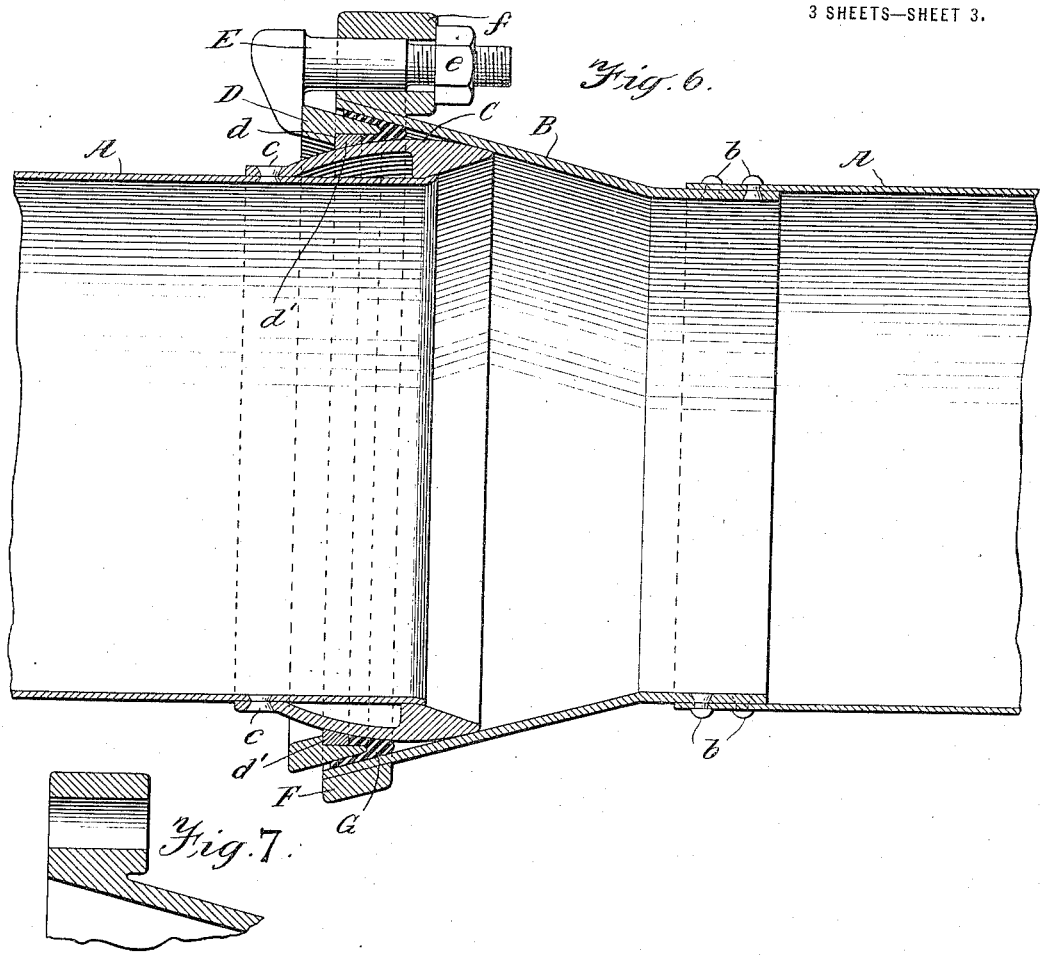

UNITED STATES PATENT OFFICE.

LEVIN S. PARKER, OF NEW YORK, N. Y., ASSIGNOR TO PARKER UNIVERSAL COUPLING COMPANY, INCORPORATED, OF NEW YORK, N. Y., A CORPORATION OF NEW YORK.

PIPE-COUPLING.

1,193,482.   Specification of Letters Patent.   Patented Aug. 1, 1916.

Application filed January 22, 1913. Serial No. 743,522.

*To all whom it may concern:*

Be it known that I, LEVIN S. PARKER, a citizen of the United States, residing in the borough of Brooklyn, city of New York, county of Kings, and State of New York, have invented certain new and useful Improvements in Pipe-Couplings, of which the following is a specification.

My invention relates to pipe couplings, and particularly to a coupling for pipes of large diameter such as pontoon pipes employed in connection with dredging apparatus.

The object of my invention is to strengthen, to increase the life of, and make more reliable, and facilitate the coupling together, of pipes of large diameter and especially the couplings employed for pontoon pipes.

In operation of hydraulic dredges, the dredge is usually anchored in position and connected to the shore by means of a floating pontoon pipe line about 24" diameter, through which a column of water is forced carrying with it the dredged material from the dredge to the spoil bank. The distance from the dredge to the spoil bank, is a varying one, and requires a pipe line connected together in such a way that the number of pipes in the line can be quickly and easily increased or decreased at will, thus lengthening or shortening the line. At the same time the line must have flexibility, which is provided for in the couplings between the pipe sections. The efficiency in a pipe line depends largely upon manipulation of the same, that is to say, the efficiency of the pipe line depends on the manner in which the various units are connected together, and the time it takes to connect up a line, and how secure these connections are when made. This requirement which is of prime importance for the construction of a good pipe line was heretofore taken into account only in a very imperfect manner. Heretofore the separate pipes have been connected with one another either by means of rubber sleeves slipped over the ends of the pipe and held in position by bands in the usual way, or by the common form of ball-joint which is very heavy, causes undue friction and is hard to connect. The rubber sleeves will only stand a limited pressure and are very short lived.

The sizes of discharge pipes of hydraulic dredges vary from 12 inches to 36 inches in diameter. The pipes are usually about 30 to 40 feet in length, supported by pontoons and the pontoon pipes are connected together with rubber connections, which connections are made up of from 8 to 15 plies of canvas, and vary in thickness from $\frac{3}{4}"$ to $1\frac{1}{4}"$, and are from two to three feet in length. This connection is placed outside of two pipes and clamped on the ends of the pipes with what are known as connection bolts. The pipe itself having half oval bands at the ends of the pipe riveted on to prevent the connection bands pulling off and the pipes separating, are not very flexible, and take considerable time to put on and take off, especially when there is any rough weather. These connections also cause an undue amount of friction in the pipe.

I will describe a pipe coupling embodying my invention, together with modifications of the same, and then point out the novel features thereof in claim.

Figure 5:
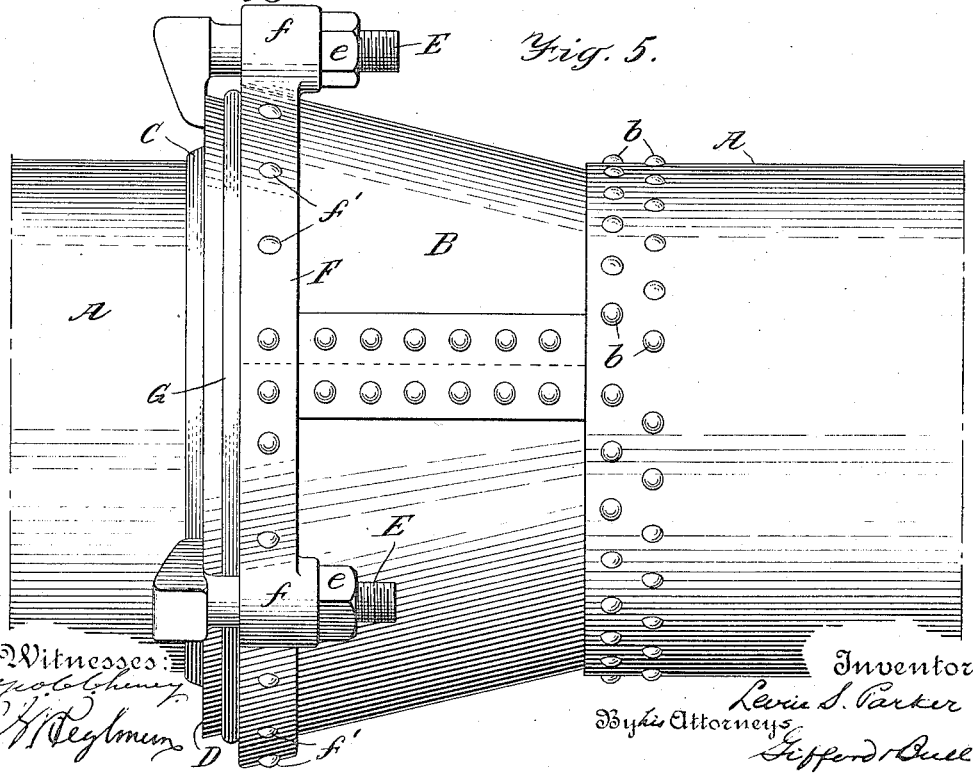

In the accompanying drawings, Figure 1 is a side elevation of a pipe section equipped at its ends with parts of a coupling embodying my invention; Fig. 2 is an end elevation of the left hand end of the pipe of Fig. 1; Fig. 3 is a vertical sectional view of the preferred form of coupling embodying my invention, and drawn to a larger scale than Figs. 1 and 2; Fig. 4 is a view similar to Fig. 3 but illustrating a modification of my invention; Fig. 5 is a view in elevation of the form of coupling shown in Fig. 4, but also showing features employed in the coupling shown in Figs. 3, 6 and 7; Fig. 6 is a view similar to Figs. 3 and 4, but showing a modification of my invention; and Fig. 7 is a detail view of a modification.

Similar reference characters designate corresponding parts in all of the figures.

A designates a section or length of pipe which may be of sheet metal or without seam which is provided at one end with a flaring portion B, here shown as being in a separate piece and joined to the pipe section A by means of rivets *b*. The flaring portion B, however, may be integral with the pipe section A. In the drawings I have shown the member B as being made of plate and riveted together, but it may be a single casting. The other end of the pipe section A is provided with an annular member C having a curved or arc shaped outer surface, The annular member C is here shown as a separate piece and joined to the pipe section A by means of rivets c. The member C may assume any desired form in cross section, provided, however, that it has a curved or arc shaped outer surface. In Figs. 3, 4, and 6 I have shown two forms which the annular member C may assume.

In making a coupling the member C of one pipe section enters the flared end B' of an adjacent pipe section, the inner surface of which affords a bearing surface for the curved outer surface of the member C. This is best shown in Figs. 3, 4 and 6. The two members are held together by means of a wedge ring D, which is retained in position between the members B and C. This arrangement of the members B and C and the wedge ring D provides for the desired flexibility in the coupling as indicated in dotted lines, Fig. 3. The inner diameter of the wedge ring D is such as to prevent it being moved over the member C, and the wedge ring is slipped onto the pipe section before the member C is riveted to the pipe section.

The wedge ring D is retained in position between the members B and C by means of bolts E, which are carried in openings provided in lugs f of a ring F. Each of said bolts is provided with a device, here shown as being a hook for engaging and disengaging the wedge-shaped ring. Any number of bolts E may be employed. In practice I have found three to be sufficient. Nuts e are provided for the hook bolts E. The ring F is joined to the flared member B by rivets f', see Fig. 5. The ring F, however, may be integral with the flared member B as shown in Fig. 7.

In the form of my invention which is best shown in Fig. 3, I provide a gasket G, preferably of rubber, between the adjacent surfaces of the two members B and C. The gasket G is preferably U-shaped in cross-section and when the wedge ring is placed in position between the members B and C, it enters the gasket and distends it, thereby making a tight joint of the coupling. The wedge ring D, shown in Fig. 3, is formed with an integral shoulder d which has the function of holding the gasket G in position during any flexing of the coupling. The shoulder d also has the function of affording a bearing for the member C when the joint is flexed. The wedge ring D, shown in Fig. 6, is also provided with a shoulder d and with a ring d' of brass or other material which acts to retain the gasket G in position as well as to afford a bearing for the member C when the joint is flexed. The coupling, when the pipe line is in service, is kept tight by the pressure in the pipe line, which pressure tends to force the members B and C apart. This tendency to separate is resisted by the wedge ring and hook bolts, and necessarily the gasket, when employed, is compressed to make the coupling all the tighter.

In order to uncouple two pipe sections it is only necessary to give the bolts E a quarter turn, thereby releasing the wedge ring D and allowing the two pipes to separate. To couple two pipes it is only required to bring the pipe sections together, place the wedge ring D in position with the gasket G on it and turn the bolts until the hooks thereof engage the wedge ring D. As soon as the pressure comes on in the pipe line, the coupling tightens up.

What I claim and desire to secure by Letters Patent of the United States is:—

A pipe coupling comprising one member having an annular frustum-shaped member, a second annular member having a curved or arc-shaped outer surface which enters the frustum-shaped member and which curved or arc-shaped surface, when the two members are assembled, has a bearing on the straight inner surface of the frustum-shaped member, a ring fitting between the two said members and having two surfaces which conform with the adjacent surfaces of the said two members, a gasket engaged by the ring to hold it between the adjacent faces of the two members, lugs carried by the first mentioned member, and each provided with an opening, a bolt extending through the opening in each lug and provided with a hook which engages with the said ring, and a nut for each bolt for holding the hook thereof against the ring whereby, upon loosening the nut and by a partial turn of the bolts, the hooks are made to engage and disengage the ring.

In testimony whereof I have hereunto signed my name in the presence of two subscribing witnesses.

LEVIN S. PARKER.

Witnesses:
 GEO. E. CRUSE,
 M. E. McNINCH.